(12) United States Patent
Marien et al.

(10) Patent No.: US 6,473,322 B2
(45) Date of Patent: Oct. 29, 2002

(54) AC-DC CONVERTER

(75) Inventors: **Petrus Cornelius Maria Marien;
Antonius Adrianus Maria Marinus**, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/838,887

(22) Filed: Apr. 20, 2001

(65) Prior Publication Data

US 2002/0006048 A1 Jan. 17, 2002

(30) Foreign Application Priority Data

Apr. 21, 2000 (EP) .............................. 00201450

(51) Int. Cl.[7] .......................... H02M 3/24; G05F 1/656
(52) U.S. Cl. .......................................... 363/82; 323/222
(58) Field of Search ............................... 363/82, 81, 80, 363/89, 127, 131, 132, 97, 98; 323/222, 282, 284

(56) References Cited

U.S. PATENT DOCUMENTS

| 4,683,529 | A |   | 7/1987  | Bucher, II        | 363/44  |
|-----------|---|---|---------|-------------------|---------|
| 4,792,887 | A | * | 12/1988 | Bernitz et al.    | 363/89  |
| 5,041,956 | A | * | 8/1991  | Marinus           | 363/49  |
| 5,146,398 | A | * | 9/1992  | Vila-Masot et al. | 363/89  |
| 5,371,667 | A | * | 12/1994 | Nakao et al.      | 363/124 |
| 5,461,303 | A | * | 10/1995 | Leman et al.      | 323/222 |
| 5,519,306 | A | * | 5/1996  | Itoh et al.       | 323/222 |
| 5,661,394 | A | * | 8/1997  | Nakao et al.      | 323/222 |
| 5,790,395 | A | * | 8/1998  | Hagen             | 363/89  |
| 6,307,356 | B1| * | 10/2001 | Dwelley           | 323/282 |

* cited by examiner

Primary Examiner—Rajnikant B. Patel

(57) ABSTRACT

In an upconverter comprising a choke, a switching element and a diode, the switching element is controlled in such a way that the time interval during which the switching element is non-conducting is proportional to the time interval during which the diode is conducting. The upconverter has a high power factor for a wide range of the amplitude of the line voltage and a wide range of power taken at the output of the upconverter.

8 Claims, 3 Drawing Sheets

AC-DC CONVERTER

BACKGROUND OF THE INVENTION

The invention relates to an AC-DC converter comprising
input terminals which are to be connected to the poles of a supply voltage source supplying an alternating voltage and output terminals,
rectifier means coupled to the input terminals for rectifying the alternating voltage,
an inductive element coupled to the rectifier means,
a buffer capacitance coupled to the output terminals,
a unidirectional element coupled between the inductive element and the buffer capacitance,
a switching element coupled to the inductive element for controlling a current through the inductive element,
a control circuit coupled to a control electrode of the switching element for generating a periodic control signal for rendering the switching element alternately conducting and non-conducting at a frequency f, and provided with
a first circuit part for setting a first time interval t-on during which the switching element is conducting in each period of the control signal, and
a second circuit part for setting a second time interval t-off during which the switching element is non-conducting in each period of the control signal.

Such an AC-DC converter is disclosed in U.S. Pat. No. 4,683,529. The control circuit of the known AC-DC converter renders the switching element conducting during a first time interval t-on, which is substantially constant during each half period of the alternating voltage supplied by the supply voltage source. During the first time interval t-on, the current in the inductive element increases substantially linearly. The value of t-on corresponds to the power taken at the output terminals. As the value of t-on is substantially constant during each half period of the alternating voltage, the value of the current taken from the supply voltage source, averaged over a period of the control signal, is substantially proportional to the alternating voltage. It is thus achieved that the power factor of the known AC-DC converter is comparatively high and the THD generated by the AC-DC converter is comparatively low. During the second time interval t-off, the current in the inductive element decreases substantially linearly. In the known AC-DC converter, the control circuit renders the switching element conducting again almost immediately after the current in the inductive element has become substantially equal to zero. This control of the switching element is referred to as "transition mode". As the current in the inductive element is substantially zero, the same applies to the current through the unidirectional element. It is thus achieved that, when the switching element becomes conducting, only a comparatively small power dissipation occurs in the unidirectional element.

The frequency of the control signal is often chosen to be comparatively high because this enables both the inductive element and an EMI filter, which is often arranged between the input terminals and the rectifier means, to be chosen so as to be comparatively small. As a result, the AC-DC converter is comparatively small and inexpensive. However, if the power taken at the output terminals decreases, or if the amplitude of the alternating voltage supplied by the supply voltage source increases, the value of t-on is reduced by the control circuit. Also at this lower value of the power taken and/or at a higher value of the maximum amplitude of the alternating voltage, the known AC-DC converter operates in the transition mode, as a result of which the frequency of the control signal increases substantially. A drawback of the known AC-DC converter resides in that, at a high frequency, the majority of the known control circuits are insufficiently capable of sufficiently accurately controlling the time interval t-on, so that instabilities in the operation of the AC-DC converter may occur. The amount of power dissipated in the switching element also is comparatively high at a comparatively high frequency of the control signal.

BRIEF SUMMARY OF THE INVENTION

It is an object of the invention to provide an AC-DC converter which can operate in a stable manner over a large range of the power taken at the output terminals and over a large range of the amplitude of the alternating voltage supplied by the supply voltage source, and which has a high power factor, a small THD and a small power dissipation in the components.

To achieve this, an AC-DC converter of the type mentioned in the opening paragraph is characterized in that the second circuit part comprises a third circuit part for setting the second time interval t-off at a value that is equal to the expression $$C2*(C1*t\text{-}on+(1+C1)*t\text{-}d),$$

wherein t-d is a third time interval during which the unidirectional element is conducting in each period of the control signal, and C1 and C2 are parameters which have a constant value during each half period of the alternating voltage, whereby C2>0, C1=>0 and t-off>t-d.

The third circuit part brings about that the second time interval t-off lasts longer than the time interval t-d. During the time interval Δt=t-off–t-d, the inductive element, the unidirectional element and the switching element do not carry current. Consequently, during the time interval Δt no power is taken from the supply voltage source, and no power is supplied to the buffer capacitance. Such a control of the switching element of an AC-DC converter is referred to as discontinuous mode. In comparison to operation in the transition mode, wherein the duration of a period of the control signal is equal to the sum of t-on and t-d, the duration of a period of the control signal is extended by Δt. An AC-DC converter in accordance with the invention is frequently dimensioned such that the AC-DC converter operates in the transition mode at a nominal value of the maximum amplitude of the alternating voltage and a nominal value of the power taken at the output terminals. If, for example, the power taken at the output terminals decreases or the maximum amplitude of the alternating voltage increases, then the third circuit part brings about a transition from operation in the transition mode to operation in the discontinuous mode. As a result, the increase of the frequency of the control signal is less than it would have been if the AC-DC converter had continued operating in the transition mode. By virtue thereof, the operation of the AC-DC converter remains stable and the power dissipation in the switching element is limited. It has also been found that the power factor of an AC-DC converter in accordance with the invention is relatively high over a large range of the power taken at the output terminals and over a large range of the amplitude of the alternating voltage supplied by the supply voltage source, while the THD generated by the AC-DC converter is comparatively low. In addition, the frequency of the control signal can be chosen to be comparatively high at a nominal load and a nominal value of the amplitude of the alternating voltage supplied by the supply voltage source. As indicated hereinabove, this has the advantage that the inductive element, and a possible EMI filter, can both be small.

More particularly, favorable results have been achieved with embodiments of an AC-DC converter in accordance with the invention wherein $C1>0$ and $C2=1$. In this case, the time interval $\Delta t$ is proportional to the sum of t-on and t-d, as a result of which the ratio between the average values of the current through the inductive element in two successive periods of the control signal during operation in the discontinuous mode is equal to the ratio during operation in the transition mode. In other words, the form of the current taken from the supply voltage source remains substantially unchanged. As a result, the power factor of the AC-DC converter remains comparatively high and the generated THD remains comparatively low if the third circuit part causes the AC-DC converter to change over to operation in the discontinuous mode. Such an embodiment of an AC-DC converter in accordance with the invention can be achieved, for example, by accommodating an analog timer (formed by a first current source and a first capacitor) in the control circuit and switching on this analog timer when the switching element becomes conducting, and switching off said analog timer when the coil current becomes substantially zero. The value present in the timer (i.e. the voltage across the first capacitor) is a measure of the time interval $\Delta t$ by which the relevant high-frequency period must be extended to obtain the desired value of t-off. The time interval $\Delta t$ can be derived from the voltage across the first capacitor by means of a second analog timer comprising a second current source and a second capacitor. The second timer is switched on when the coil current is substantially equal to zero. The moment the voltage across the second capacitor is equal to the voltage across the first capacitor, the time interval $\Delta t$ has elapsed and the switching element must be rendered conducting again.

In a preferred embodiment of an AC-DC converter in accordance with the invention, the constant $C1$ is chosen to be equal to zero and the constant $C2$ is chosen to be larger than 1. If the constant $C1$ is chosen to be equal to zero, the time interval $\Delta t$ is not proportional to t-on+t-d, but to t-d. In practice it has been found to be comparatively easy to embody the third circuit part such that $C1$ is equal to zero. It has also been found that the power factor is comparatively high and the THD comparatively low over a large range of the power taken at the output terminals and over a large range of the amplitude of the alternating voltage supplied by the supply voltage source. Satisfactory results have been achieved, more particularly, using embodiments wherein, during operation, the third circuit part sets t-off at a value equal to $K*(Um/(U0-Um))$, wherein K is a constant, Um is the instantaneous amplitude of the rectified alternating voltage and U0 is the voltage between the output terminals of the AC-DC converter.

In practice it has been found that the current through the inductive element does not become exactly zero at the end of the third time interval t-d; instead an oscillation occurs whose frequency f-osc is determined by the self-inductance of the inductive element and parasitic capacitances, such as the parasitic capacitance of the switching element. As a result of this oscillation, an alternating voltage of frequency f-osc is applied across the switching element. If the switching element were to be rendered conducting while this alternating voltage has a comparatively high amplitude, then a comparatively high power dissipation would take place in the switching element. In order to preclude this, the control circuit of an AC-DC converter in accordance with the invention is preferably provided with a fourth circuit part for keeping the switching element in the non-conducting state in dependence upon the voltage across the switching element. As a result of this fourth circuit part, the switching element can only be rendered conducting when the amplitude of the alternating voltage across the switching element is comparatively low, so that the power dissipation in the switching element remains relatively small.

Immediately after the unidirectional element has stopped carrying current at the end of the time interval t-d, the unidirectional element is still comparatively highly conducting for a current in the high-resistance direction. If, when the AC-DC converter is operated in the transition mode, the switching element would be rendered conducting immediately after the unidirectional element has stopped carrying current at the end of the time interval t-d, then a comparatively high current would flow from the buffer capacitance through the unidirectional element and the switching element for a short time period. Such a current causes power dissipation, more particularly in the unidirectional element, and also reduces the "overall efficiency" of the AC-DC converter. To preclude that the switching element is rendered conducting too soon after the current through the unidirectional element has become zero, the first circuit part of an AC-DC converter in accordance with the invention is preferably provided with a fifth circuit part for keeping the switching element in the non-conducting state, during a fourth time interval, after the unidirectional element has become non-conducting. Good results have been obtained with embodiments wherein the fourth time interval is inversely proportional to the maximum amplitude of the current through the inductive element during the first time interval.

In general, an AC-DC converter in accordance with the invention is designed to supply a power to a load coupled to the output terminals, which power lies within a range limited by a maximum power and a minimum power. In addition, the design often is such that the AC-DC converter operates in the transition mode at the maximum power taken. If the power taken is reduced, the frequency of the control signal increases. This increase is limited to a certain extent by the third circuit part. However, the frequency of the control signal is governed not only by the power taken but also by the amplitude of the alternating voltage supplied by the supply voltage source: the frequency of the control signal is higher at each power supplied as the amplitude of the alternating voltage is higher. If the amplitude of the alternating voltage is comparatively high and the power supplied is comparatively small, the frequency of the control signal may become unacceptably high in spite of the frequency-limiting effect of the third circuit part. To make sure that the power supplied over the same range can be set, also if the amplitude of the alternating voltage is high, it is desirable to reduce the frequency of the control signal at the maximum value of the power supplied. For this reason, it is advantageous for the control circuit of an AC-DC converter in accordance with the invention to be provided with a sixth circuit part for setting the frequency of the control signal, at a predetermined amount of power taken from the output terminals, in dependence upon the amplitude of the alternating voltage. If the amplitude of the alternating voltage is comparatively high, the sixth circuit part reduces the frequency of the control signal. As a result, the AC-DC converter operates in the discontinuous mode even if the maximum power is taken. By virtue of this comparatively low frequency of the control signal at the maximum power taken, the frequency of the control signal can no longer reach an unacceptably high value when the power taken is reduced.

These and other aspects of the invention will be apparent from and elucidated with reference to the embodiment(s) described hereinafter.

DETAILED DESCRIPTION OF THE INVENTION

Figure 1:
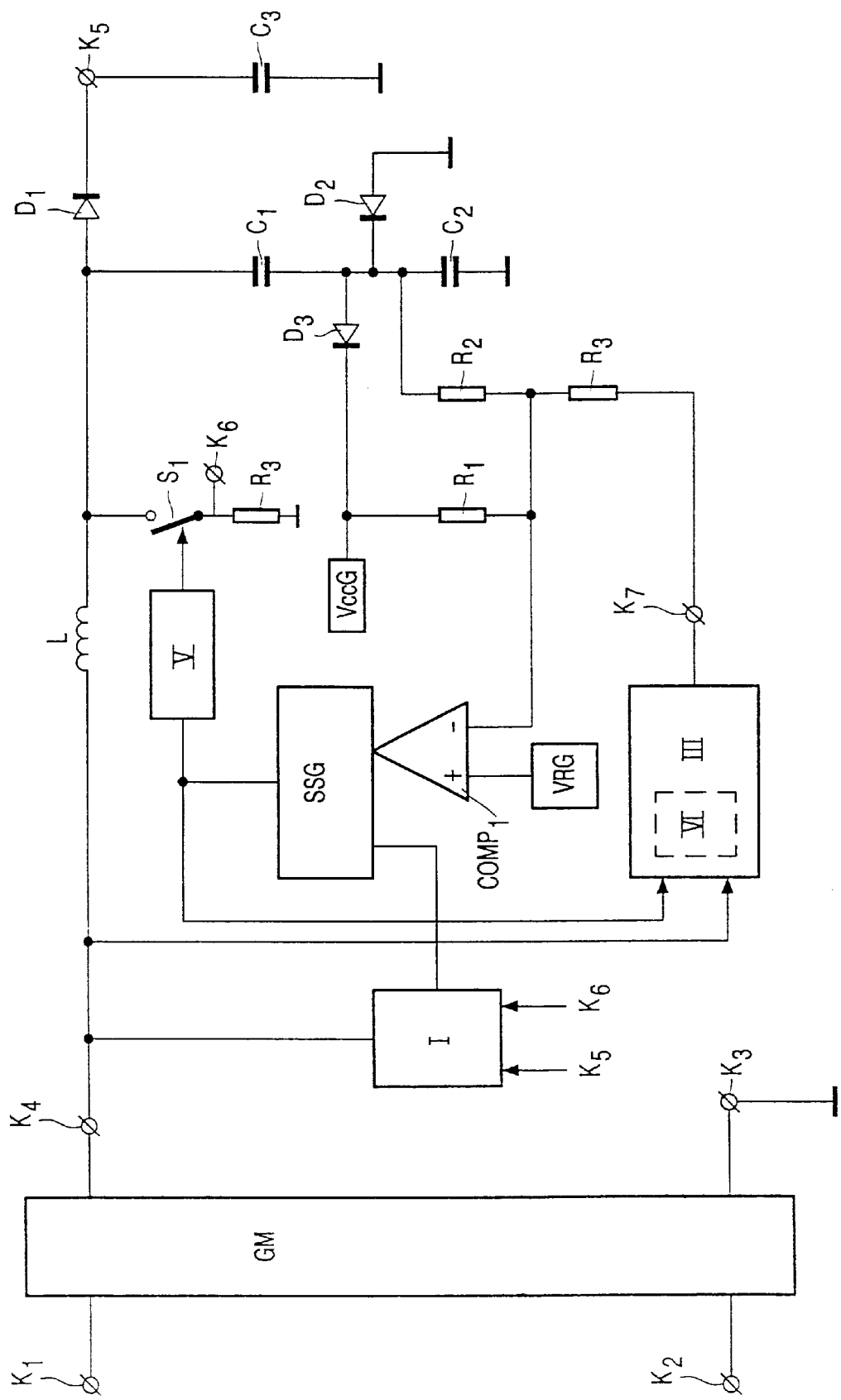
FIG. 1 shows an example of an AC-DC converter in accordance with the invention.

In FIG. 1, K1 and K2 denote input terminals which are to be connected to the poles of a supply voltage source supplying an alternating voltage. Input terminals K1 and K2 are connected to respective inputs of rectifier means GM for rectifying the alternating voltage. In this example, the rectifier means GM are formed by a diode bridge. Terminal K4 is a first output and terminal K3 is a second output of the rectifier means GM. Terminal K4 is connected to terminal K3 by means of a series arrangement of coil L, switching element S1 and ohmic resistor R3. In this example, coil L forms an inductive element. Switching element S1 forms a switching element for controlling a current through the inductive element. K6 is a junction point of switching element S1 and ohmic resistor R3. The series arrangement of switching element S1 and ohmic resistor R3 is shunted by a series arrangement of diode D1 and capacitor C3. Diode D1 and capacitor C3 form, in this example, a unidirectional element and a buffer capacitance, respectively. A junction point K5 of diode D1 and capacitor C3 forms a first output terminal of the AC-DC converter. A second output terminal of the AC-DC converter is formed by terminal K3. All other components and circuit parts of the example shown in FIG. 1 jointly form a control circuit which is coupled to a control electrode of the switching element S1 for generating a periodic control signal intended to render the switching element S1 alternately conducting and non-conducting at a frequency f.

Circuit part I is a first circuit part for setting a first time interval t-on during which the switching element S1 is conducting in each period of the control signal. The first time interval t-on is set in dependence upon the maximum amplitude of the alternating voltage and the power taken at the output terminals. A first input of circuit part I is connected to the first output terminal K5. A second input of circuit part I is connected to the junction point K6 of switching element S1 and ohmic resistor R3. A third input of circuit part I is connected to terminal K4. In this example, circuit part VI forms a sixth circuit part for setting the frequency f of the control signal, at a predetermined amount of power taken at the output terminals, in dependence upon the amplitude of the alternating voltage. The structure of circuit part I is known for the greater part from the prior art. Circuit part I may be formed, for example, by means of the IC MC34262 or MC33262 manufactured by Motorola. An output of circuit part I is connected to a first input of circuit part SSG. Circuit part SSG forms a control signal generator. An output of circuit part SSG is connected to an input of circuit part V. Circuit part V forms a fifth circuit part for keeping the switching element S1 in the non-conducting state, during a fourth time interval, after the unidirectional element D1 has become non-conducting. An output of circuit part V is connected to the control electrode of the switching element S1. The output of circuit part SSG is also connected to a first input of circuit part III. Circuit part III forms a third circuit part for setting a second time interval t-off, during which the switching element S1 is non-conducting in each period of the control signal, at a value equal to the expression $C2*(C1*t\text{-}on+(1+C1)*t\text{-}d)$, wherein t-d is a third time interval during which diode D1 is conducting in each period of the control signal, and C1 and C2 are parameters which have a constant value during each half period of the alternating voltage, whereby $C1 => 0$, $C2 > 0$ and t-off > t-d. In the example shown in FIG. 1, the constant C1 is chosen to be equal to zero, so that circuit part III sets the second time interval t-off at a value which is proportional to the third time interval t-d. A second input of circuit part III is connected to output K4 of the rectifier means GM. Terminal K7 forms an output of circuit part III. Circuit part III comprises a circuit part VI. In this example, circuit part VI forms a sixth circuit part for setting the frequency f of the control signal, at a predetermined amount of power taken at the output terminals, in dependence upon the amplitude of the alternating voltage. A junction point of diode D1 and coil L is connected to output terminal K3 by means of a series arrangement of capacitors C1 and C2. Capacitor C2 is shunted by diode D2. Terminal K7 is connected to a junction point of capacitors C1 and C2 by means of a series arrangement of ohmic resistors R3 and R2. Ohmic resistor R2 is shunted by a series arrangement of diode D3 and ohmic resistor R1. A junction point of diode D3 and ohmic resistor R1 is connected to an output of circuit part VccG. Circuit part VccG is a circuit part for generating a voltage Vcc. This voltage is present at the output of the circuit part VccG. The voltage Vcc is also used, in a manner which is not indicated in FIG. 1, to feed parts of the AC-DC converter, in particular parts embodied so as to be an IC. A junction point of ohmic resistors R2 and R3 is connected to a first input of comparator Comp1. A second input of comparator Comp1 is connected to an output of a circuit part VRG. Circuit part VRG is a reference voltage generator. An output of comparator Comp1 is connected to a second input of circuit part SSG. Capacitors C1 and C2, diodes D2 and D3, ohmic resistors R1 and R2, comparator Comp1 and reference voltage generator VRG jointly form a fourth circuit part for keeping the switching element S1 in the non-conducting state in dependence upon the voltage across the switching element. Circuit part III and the fourth circuit part jointly form a second circuit part for setting a second time interval t-off during which the switching element S1 is non-conducting in each period of the control signal.

The operation of the example shown in FIG. 1 is as follows.

If the input terminals K1 and K2 are connected to a supply voltage source supplying an alternating voltage, and a load is connected to the output terminals K3 and K5, then the control circuit renders the switching element S1 alternately conducting and nonconducting at a frequency f. If the load is a nominal load and the alternating voltage has a nominal maximum amplitude, then the AC-DC converter operates in the transition mode. During the first time interval t-on, the switching element S1 is rendered conducting by the control signal, and a current flows from output K4 via coil L, switching element S1 and ohmic resistor R3 to the output terminal K3. The amplitude of this current increases substantially linearly and is proportional to the instantaneous value of the rectified alternating voltage present at the output K4. At the end of the first time interval t-on, the control circuit renders the switching element S1 non-conducting. During the second time interval t-off, the switching element S1 remains in the non-conducting state. After the switching element S1 has become non-conducting, a current flows from a first end of coil L, via diode D1, capacitor C3, output terminal K3, diode bridge GM and output K4 to a second side of coil L. The amplitude of this current decreases substantially linearly. Capacitor C3 is charged by this current. At the end of the time interval t-off, the potential at the output of circuit part III changes from high to low. In the last part of the time interval t-off, i.e. when the amplitude of the current through coil L has decreased substantially, the current through coil L becomes an alternating current the frequency of which is determined by the inductance of coil L and the capacitance of a number of parasitic capacitances, such as a parasitic capacitance which is parallel to the switching element S1. This alternating current causes an alternating voltage to be present across the switching element S1, the frequency of which is equal to that of the alternating current in the coil L. If the switching element S1 were to be rendered conducting at a moment in time when the amplitude of the voltage across the switching element is relatively high, then a considerable amount of power would be dissipated in the switching element. This would lead to a reduction of the "overall efficiency" of the AC-DC converter as well as of the service life of the switching element. In the AC-DC converter shown in FIG. 1, such a dissipation in the switching element is counteracted by the fourth circuit part. Capacitors C1 and C2 form a capacitive voltage divider, so that a voltage is always present across capacitor C2, which voltage is proportional to the sum of the voltage across the switching element and the voltage across the ohmic resistor R3. The voltage across capacitor C2 is "clamped" (akkoord ?) between ground (−a diode junction) and Vcc (+a diode junction) by the diodes D2 and D3. If the voltage across capacitor C2 is high or the voltage at the output of circuit part III is high, then the potential at the first input of comparator Comp1 is also high. Only if both the voltage across capacitor C2 and the voltage at the output of circuit part III are low, then the potential at the first input of comparator Comp1 is lower than the reference voltage at the second input of comparator Comp1. As a result, the voltage at the output of comparator Comp1 and the second input of circuit part SSG changes from low to high, and the voltage at the output of circuit part SSG and the input of circuit part V also changes from low to high. When a fourth time interval, which starts after the voltage at the input of circuit part V has become high, has elapsed, circuit part V causes the voltage at the output of circuit part V to become high. As a result, switching element S1 is made conducting. By means of circuit parts that are not shown in FIG. 1, the fourth time interval is rendered inversely proportional to the maximum amplitude of the current through the coil L during the first time interval. It is to be noted that both the fourth time interval and the period of the alternating voltage, present across the switching element after the coil current has decreased substantially, often are comparatively short in comparison with the duration of a high-frequency period. In the case of operation in the transient mode, the second time interval t-off is substantially equal to the third time interval t-d. The (small) difference between these two time intervals is caused by the fourth and the fifth circuit part. The following equation applies to the third time interval t-d:

$$t\text{-}d = t\text{-}on*(Um/(U0-Um)).$$

In this equation, Um is the instantaneous amplitude of the rectified alternating voltage present at the output K4. U0 is the amplitude of the alternating voltage present between the output terminals K3 and K5. The circuit part III sets the time interval t-off at a value to which the following equation applies:

$$t\text{-}off = K*(Um/(U0-Um)).$$

In this equation, K is a constant which is determined by the dimensions of the circuit part III. These dimensions are chosen to be such that, at a nominal load and a comparatively low maximum amplitude of the alternating voltage, t-d=t-off or K=t-on. In other words, at a nominal load and a comparatively low value of the amplitude of the alternating voltage, the AC-DC converter operates in the transition mode.

If the power taken at the output terminals K3 and K5 decreases and/or the maximum amplitude of the alternating voltage increases, the circuit part I sets a lower value for t-on. As a result, also the value of t-d decreases. The value of t-off, however, remains unchanged so that t-off is larger than t-d in this situation. In this case, the AC-DC converter operates in the discontinuous mode. Since t-on may be considered to be constant over a half period of the alternating voltage supplied by the supply voltage source, it can be derived from the above formulas that t-off is proportional to t-d in accordance with the formula t-off=(K/t-on)*t-d. As the AC-DC converter changes over to discontinuous mode operation, a decrease of the load causes the frequency of the control signal to increase to a smaller degree than would have been the case if the DC-AC converter remained operating in the transient mode. It has also been found that, also at a low load, the DC-AC converter shown in FIG. 1 has a comparatively high power factor and generates only a comparatively small THD.

If, at a given load at the output terminals, the amplitude of the alternating voltage increases, then the amplitude of the voltage present at the input of the sixth circuit part VI increases too. In response to this increase, the circuit part VI increases the value of the constant K, as a result of which the frequency of the control signal decreases. An increase of the amplitude of the alternating voltage also causes the circuit part I to set a lower value for t-on. This decrease of t-on is compensated for by the increase of t-off brought about by circuit part VI. It is thus precluded, even when the load is comparatively high, that an increase of the maximum amplitude of the alternating voltage causes a substantial increase of the frequency. In the case of a reduction of the load, such a substantial increase would cause the frequency to become so high that a comparatively large power dissipation occurs in the switching element S1 along with possible instabilities. These problems are precluded by virtue of the presence of the sixth circuit part.

Figure 2:
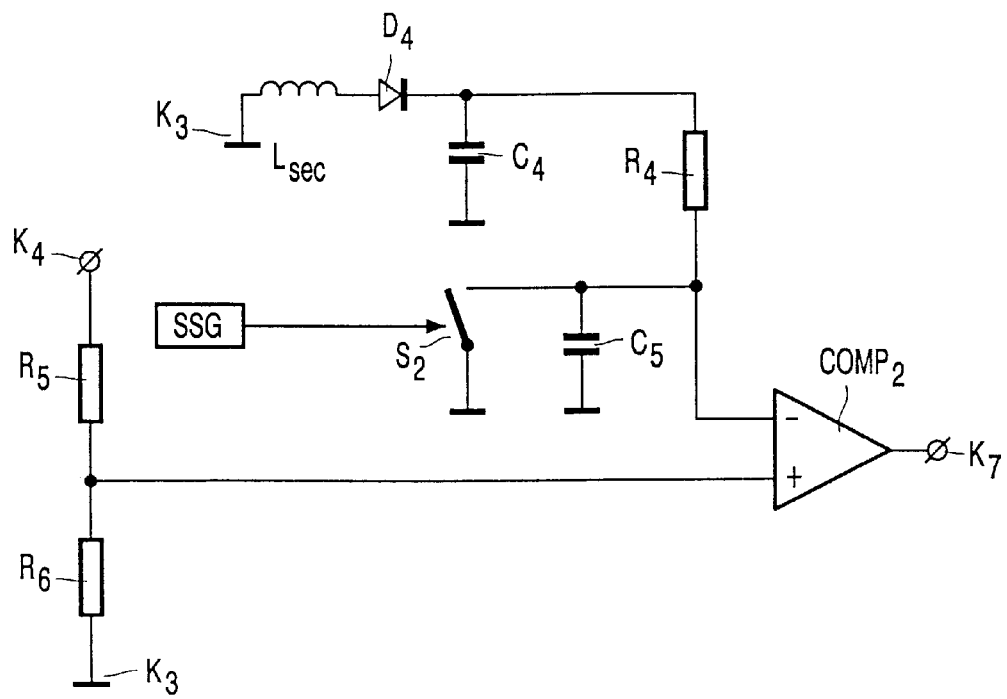
FIG. 2 is a more detailed view of an embodiment of a part of the control circuit of the example shown in FIG. 1.

FIG. 2 shows a first embodiment of the circuit part III which can be used in the example of an AC-DC converter in accordance with the invention as shown in FIG. 1. In the embodiment shown in FIG. 2, the circuit part VI is not included. In FIG. 2, Lsec is an additional turn which is provided on coil L and magnetically coupled to the main turn whose end portions are connected to, respectively, output K4 and diode D1. A series arrangement of the additional turn Lsec, diode D4 and ohmic resistor R4 connects output terminal K3 to a first input of comparator Comp2. This series arrangement of the additional turn Lsec, diode D4 and ohmic resistor R4 is shunted by a capacitor C5. The series arrangement of additional turn Lsec and diode D4 is shunted by a capacitor C4. Capacitor C5 is shunted by a switching element S2. A control electrode of the switching element S2 is connected to the output of the circuit part SSG. Outputs K4 and K3 of the rectifier means GM are connected to each other by means of a series arrangement of ohmic resistors R5 and R6. A junction point of ohmic resistors R5 and R6 is connected to a second input of comparator Comp2. An output of comparator Comp2 forms the output of this embodiment of the circuit part III. The operation of the embodiment of circuit part III shown in FIG. 2 is as follows.

If the current through coil L charges the capacitor C3, then the voltage across the main turn of coil L is approximately equal to U0–Um. As the additional turn Lsec is magnetically coupled to the main turn, a voltage is present across the additional turn Lsec which is directly proportional to U0–Um. As a result, the voltage across capacitor C4 is also proportional to U0–Um. The circuit part SSG renders the switching element S2 and the switching element S1 non-conducting at the same time. After the switching element S2 has been rendered non-conducting, capacitor C5 is charged by a current source formed by the additional turn Lsec, diode D4, capacitor C4 and ohmic resistor R4. This current source supplies a current whose amplitude is proportional to U0–Um. Thus, the voltage across capacitor C5 is proportional to both the time interval during which capacitor C5 is charged and to U0–Um. Ohmic resistors R5 and R6 form a resistive voltage divider, so that the voltage present at the second input of comparator Comp2 is proportional to Um. When the voltage across capacitor C5 has become equal to the voltage at the second input of comparator Comp2, the voltage at the output of comparator Comp2 changes from high to low. From the foregoing it can be readily derived that the t-off set by the embodiment shown in FIG. 2 complies with the equation:

$$t\text{-}off = K^*(Um/(U0-Um)),$$

wherein K is a constant which is determined by the dimensions of the embodiment. Circuit part SSG subsequently renders the switching element S2 conducting, so that capacitor C5 becomes discharged.

Figure 3:
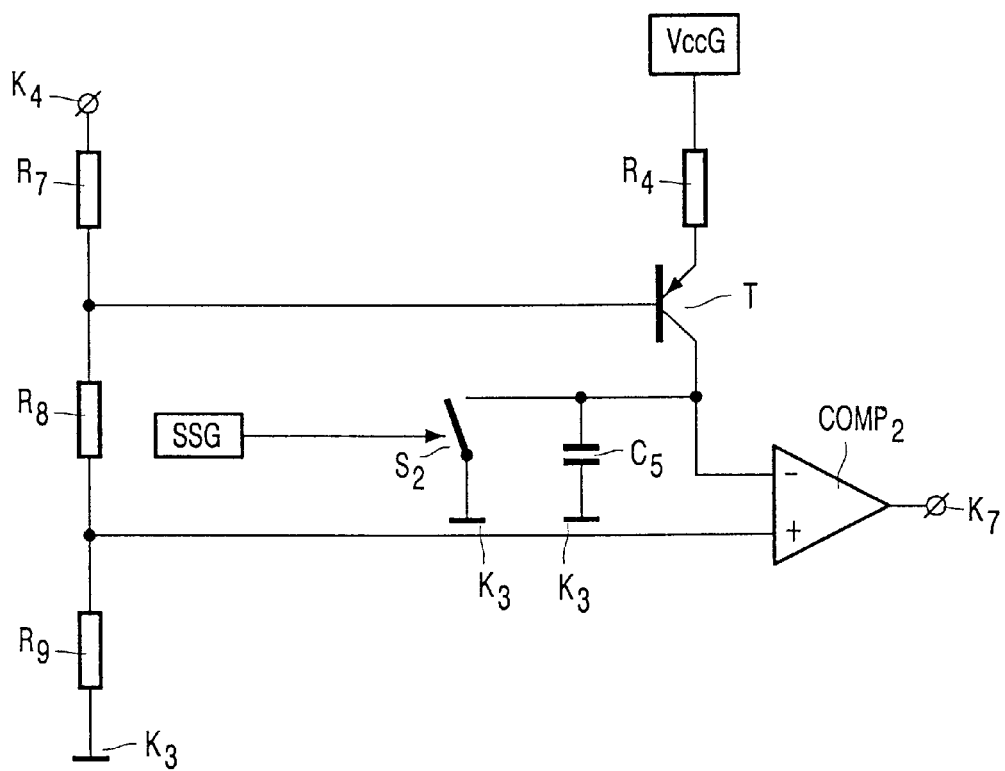
FIG. 3 shows another embodiment of the part of the control circuit shown in FIG. 2.

FIG. 3 shows a further embodiment of circuit part III, which can be used in the example of an AC-DC converter in accordance with the invention as shown in FIG. 1. In the further embodiment shown in FIG. 3, the circuit part VI is not included. Corresponding components and circuit parts are indicated by means of the same symbols. The output of circuit part VccG is connected to a first input of comparator Comp2 by means of a series arrangement of ohmic resistor R4 and bipolar transistor T. The first input of comparator Comp2 is also connected to output terminal K3 via capacitor C5. Capacitor C5 is shunted by switching element S2. A control electrode of switching element S2 is connected to the output of circuit part SSG. Outputs K4 and K3 of the rectifier means GM are connected to each other by means of a series arrangement of ohmic resistors R7, R8 and R9. A junction point of ohmic resistor R7 and ohmic resistor R8 is connected to a base electrode of bipolar transistor T. A junction point of ohmic resistor R8 and ohmic resistor R9 is connected to a second input of comparator Comp2. An output of comparator Comp2 forms the output of circuit part III in this embodiment.

The operation of the embodiment shown in FIG. 3 is as follows. As the three ohmic resistors R7, R8 and R9 form a resistive voltage divider, a voltage is present at the base electrode of bipolar transistor T, which voltage is proportional to Um in accordance with Vbase=α*Um, wherein Vbase is the voltage at the base electrode of the transistor T, and α is a proportionality constant. Circuit part VccG is dimensioned such that a voltage is present at the output thereof, which voltage is proportional to U0 in accordance with Vcc=α*U0. It is thus brought about that a voltage proportional to U0–Um is present across the base-emitter transition of transistor T. Circuit part VccG, transistor T and the ohmic resistors R7, R8 and R9 jointly form a current source supplying a current which is proportional to U0–Um, and which current charges capacitor C5 when the switching element S2 is non-conducting. A voltage that is proportional to Um is present at the second input of comparator Comp2. When the voltage across capacitor C5 has become equal to the voltage at the second input of comparator Comp2, the voltage at the output of comparator Comp2 changes from high to low. From the foregoing it can be readily derived that the t-off set by the embodiment shown in FIG. 2 complies with the following equation:

$$t\text{-}off = K^*(Um/(U0-Um)),$$

wherein K is a constant that is determined by the dimensions of the embodiment. Circuit part SSG subsequently renders the switching element S2 conducting, as a result of which capacitor C5 is discharged.

Figure 4:
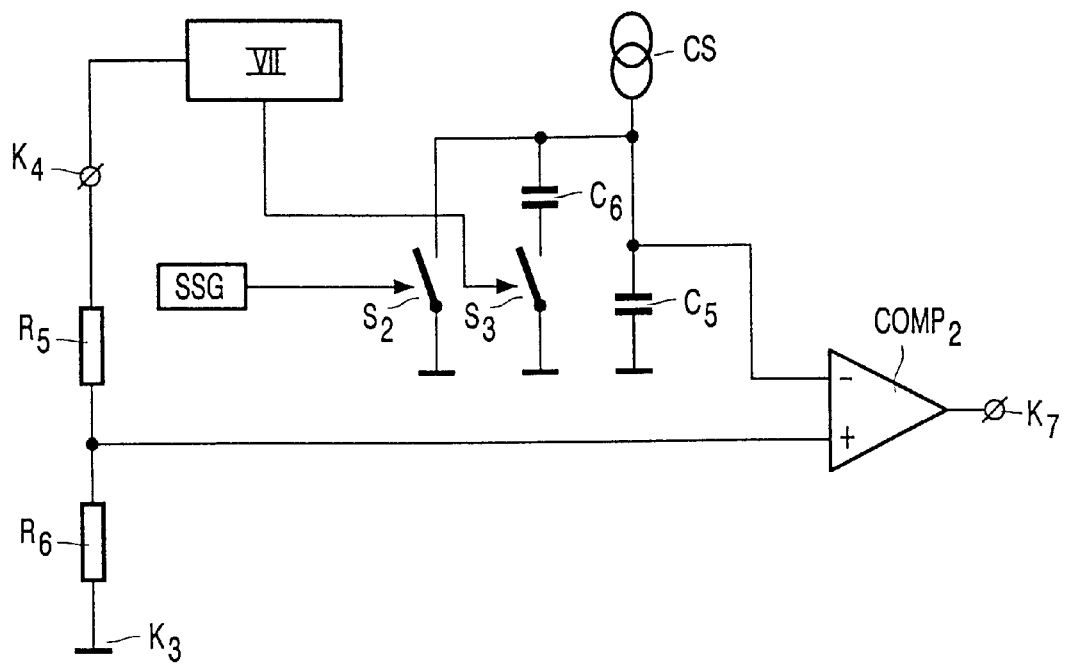
FIG. 4 also is a detailed view of an embodiment of a part of the control circuit of the example shown in FIG. 1.

FIG. 4 shows an embodiment of circuit part III which can be used in the embodiment of an AC-DC converter shown in FIG. 1. The structure of this embodiment largely corresponds to that of the embodiment shown in FIG. 2. CS is a current source which may be embodied so as to be identical to the current source of the embodiment shown in FIG. 2. The embodiment of circuit part III shown in FIG. 4 is provided with a circuit part VI for setting the frequency f of the control signal, at a predetermined amount of power taken at the output terminals, in dependence upon the amplitude of the alternating voltage. This circuit part VI is formed by capacitor C6, switching element S3 and circuit part VII. Circuit part VII is a circuit part used for keeping the switching element S3 in the conducting or non-conducting state in dependence upon the amplitude of the alternating voltage. Capacitor C5 is shunted by a series arrangement of switching element S3 and capacitor C6. A control electrode of switching element S3 is connected to an output of circuit part VII. An input of circuit part VII is connected to output K4.

The operation of the embodiment shown in FIG. 4 substantially corresponds to the operation of the embodiment shown in FIG. 2. If the maximum amplitude of the alternating voltage is comparatively low, the circuit part VII keeps the switching element S3 in the non-conducting state. If, however, the maximum amplitude of the alternating voltage increases and exceeds a predetermined value, then the circuit part VII renders the switching element S3 conducting. As a result, capacitor C6 is parallel-connected to capacitor C5. The current source CS now requires more time to charge both capacitors C5 and C6 to a voltage level equal to the voltage present at the second input of comparator Comp2. As a result, the value of the constant K and hence the service life of t-off increase. In the embodiment shown in FIG. 4, t-off is subjected once to a stepped increase if the maximum amplitude of the alternating voltage exceeds a predetermined value.

Figure 5:
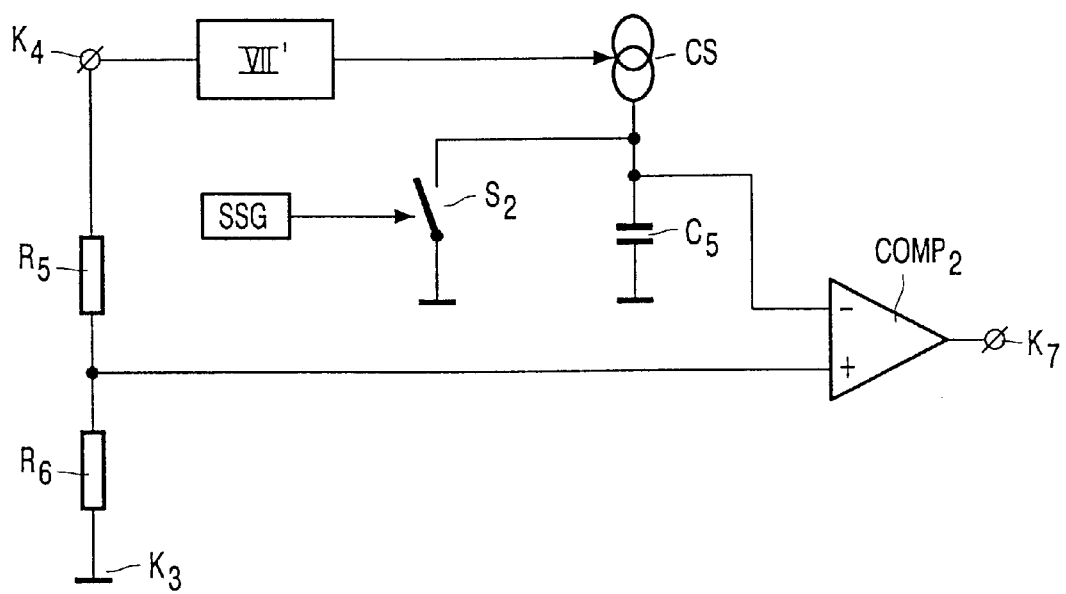
FIG. 5 shows another embodiment of the part of the control circuit shown in FIG. 4.

FIG. 5 shows an embodiment of circuit part III in conjunction with circuit part VI, wherein the constant K is a continuous function of the maximum amplitude of the alternating voltage. As a result, the same applies to t-off. The structure of the embodiment shown in FIG. 5 largely corresponds to the embodiment shown in FIG. 2. In this embodiment, however, CS is a current source whose current can be adjusted by means of a voltage present at an input of CS. The input of current source CS is connected to an output of circuit part VII'. Circuit part VII' is a circuit part used for setting the voltage present at the output of circuit part VII' in dependence upon the maximum amplitude of the alternating voltage. For this purpose, an input of circuit part VII' is connected to an output K4.

The operation of the example shown in FIG. 5 largely corresponds to the operation of the embodiment shown in FIG. 2. However, if the maximum amplitude of the alternating voltage increases, then circuit part VII' increases the voltage at the input of current source CS, as a result of which the current supplied by the current source CS decreases (akkoord ?, zie Ned. Tekst). This leads to an increase of the value of K and hence of the service life of t-off.

What is claimed is:

1. An AC-DC converter comprising
   input terminals which are to be connected to the poles of a supply voltage source supplying an alternating voltage and output terminals,
   rectifier means coupled to the input terminals for rectifying the alternating voltage,
   an inductive element coupled to the rectifier means,
   a buffer capacitance coupled to the output terminals,
   a unidirectional element coupled between the inductive element and the buffer capacitance,
   a switching element coupled to the inductive element for controlling a current through the inductive element,
   a control circuit coupled to a control electrode of the switching element for generating a periodic control signal for rendering the switching element alternately conducting and non-conducting at a frequency f, and provided with
   a first circuit part for setting a first time interval t-on during which the switching element is conducting in each period of the control signal, and
   a second circuit part for setting a second time interval t-off during which the switching element is non-conducting in each period of the control signal, characterized in that the second circuit part comprises a third circuit part for setting the second time interval t-off at a value that is equal to the expression $$C2*(C1*t\text{-}on+(1+C1)*t\text{-}d),$$

wherein t-d is a third time interval during which the unidirectional element is conducting in each period of the control signal, and C1 and C2 are parameters which have a constant value during each half period of the alternating voltage, whereby C2>0, C1=>0 and t-off>t-d.

2. An AC-DC converter as claimed in claim 1, wherein C1>0 and C2=1.

3. An AC-DC converter as claimed in claim 1, wherein C1=0 and C2>1.

4. An AC-DC converter as claimed in claim 3, wherein, during operation, the third circuit part sets t-off at a value equal to K*(Um/(U0−Um)), wherein K is a constant, Um is the instantaneous amplitude of the rectified alternating voltage and U0 is the voltage between the output terminals of the AC-DC converter.

5. An AC-DC converter as claimed in claim 1, wherein the control circuit is provided with a fourth circuit part for keeping the switching element in the non-conducting state in dependence upon the voltage across the switching element.

6. An AC-DC converter as claimed in claim 1, wherein the control circuit is provided with a fifth circuit part for keeping the switching element in the non-conducting state, during a fourth time interval, after the unidirectional element has become non-conducting.

7. An AC-DC converter as claimed in claim 6, wherein the fourth time interval is inversely proportional to the maximum amplitude of the current through the inductive element during the first time interval.

8. An AC-DC converter as claimed in claim 1, wherein the control circuit is provided with a sixth circuit part for setting the frequency f of the control signal, at a predetermined amount of power taken at the output terminals, in dependence upon the amplitude of the alternating voltage.

* * * * *